United States Patent

[11] 3,625,578

| [72] | Inventors | James B. Loftis<br>Remlap;<br>David L. Moody; James H. Phillips, both of<br>Oneonta, all of Ala. |
|---|---|---|
| [21] | Appl. No. | 79,857 |
| [22] | Filed | Oct. 12, 1970 |
| [45] | Patented | Dec. 7, 1971 |
| [73] | Assignee | Robbins Machinery Company |

[54] GUIDE BUSHING FOR ROTARY DRILL PIPE
9 Claims, 3 Drawing Figs.

[52] U.S. Cl. .................................................. 308/187.1,
277/58, 308/36.1
[51] Int. Cl. ............................................... F16c 33/72
[50] Field of Search ..................................... 308/187.1,
36.1; 277/94, 58, 59

[56] References Cited
UNITED STATES PATENTS

| 2,354,724 | 8/1944 | Wessenger | 308/187.1 |
| 2,419,034 | 4/1947 | Primus | 308/187.1 |
| 2,473,513 | 6/1949 | Dewey | 308/187.1 |
| 2,688,520 | 9/1954 | Covington | 308/187.1 |
| 2,936,715 | 5/1960 | Southam et al. | 277/94 X |
| 2,990,220 | 6/1961 | Malone | 308/187.1 |
| 2,996,320 | 8/1961 | Mason | 308/36.1 |

Primary Examiner—Martin P. Schwadron
Assistant Examiner—Barry Grossman
Attorney—Jennings, Carter & Thompson ABSTRACT: Guide bushing assembly having cylindrical member with hardened inner surface of dimension to engage and rotate with drill pipe and permit relative axial movement. Cylindrical member supported by lubricated bearing assembly between cylindrical member and outer housing. Flexible lubricant seals limit egress of lubricant and ingress of foreign materials. Cover on cylindrical member nearest hole being bored extends alongside adjacent end of housing with ring seal in oppositely disposed recesses therebetween. Resilient O-ring in one recess urges ring seal toward other recess.

PATENTED DEC 7 1971
3,625,578
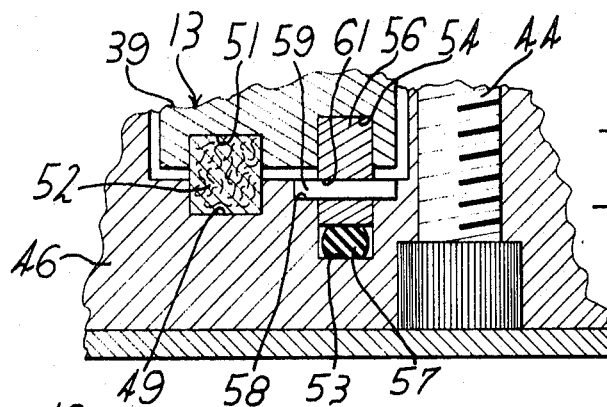
Fig 2.
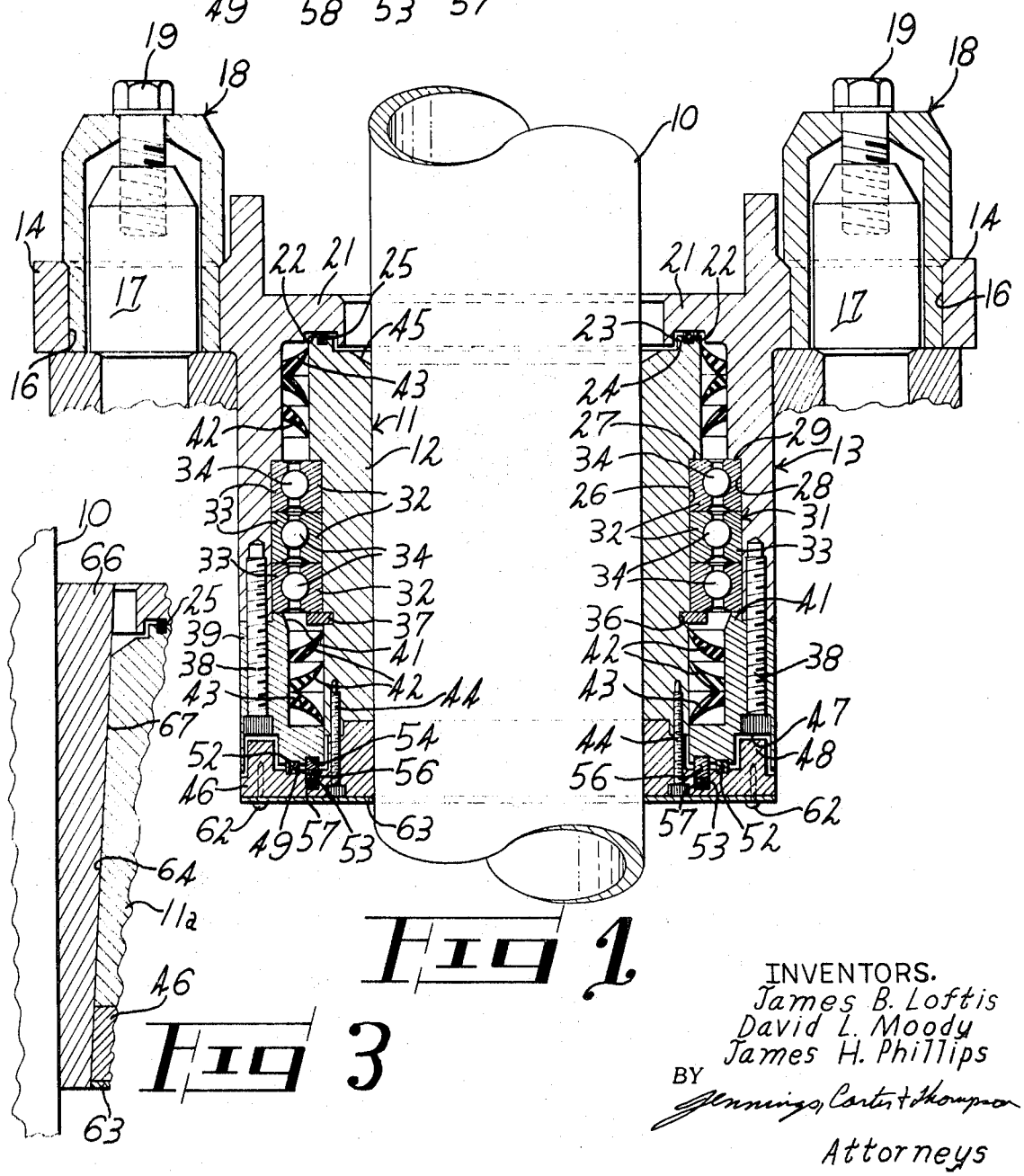
Fig 1.
Fig 3
INVENTORS.
James B. Loftis
David L. Moody
James H. Phillips
BY
Jennings, Carter & Thompson
Attorneys

GUIDE BUSHING FOR ROTARY DRILL PIPE

BACKGROUND OF THE INVENTION

This invention relates to a guide bushing assembly and more particularly to a guide bushing assembly for a rotary drill pipe which is adapted to convey air from an air pressure source to clear a hole being bored of cuttings with cuttings passing outwardly of the hole between the drill pipe and the hole.

As is well known in the art to which our invention relates, difficulties have been encountered in guiding drill pipe to the hole being bored due to the fact that the guide assemblies heretofore employed have been stationary with the drill pipe rotating relative to the guide assembly. The constant build up of foreign particles between the drill pipe and the stationary guide assembly brings about a bind between the guide assembly and the drill pipe whereby considerable torque is produced. This buildup of torque not only increases the amount of wear to the drill pipe and the guide assembly but also increases the amount of power required to rotate the drill pipe. Also, where the rotary drill pipe engages the stationary surface, considerable vibration and noise occurs, thus adding further to the wear of the guide assembly and the rotating pipe and bringing about unpleasant working conditions. Furthermore, as the drill bit encounters hard and soft areas or voids in the earth, the bit tends to move laterally to thus put a considerable lateral load on the bearing assembly. Accordingly, where stationary guide assemblies are employed, this lateral thrust on the guide assembly brings about excessive wear, vibration and noise.

BRIEF SUMMARY OF THE INVENTION

In accordance with our invention, we provide a cylindrical bearing member which rotates with the drill pipe and yet permits axial movement of the drill pipe relative thereto. A lubricated bearing assembly having rotatable bearings is mounted between the cylindrical bearing member and an outer housing whereby the cylindrical bearing member is rotatably mounted in the outer housing. Annular flexible seals are provided between the housing and the cylindrical bearing member preventing the egress of lubricant and ingress of foreign materials. The end of the guide assembly nearest the hole being bored is covered by a cover which rotates with the cylindrical bearing and extends outwardly alongside the supporting housing therefor. A ring seal is interposed between the cover and the adjacent end of the housing with oppositely disposed annular recesses in the cover and the adjacent end of the housing receiving the ring seal. A resilient O-ring is mounted in one of the recesses to urge the ring seal toward the other recess and thereby assure a positive seal between the rotatable portion of the guide assembly and the stationary part thereof.

Apparatus embodying features of our invention is illustrated in the accompanying drawing, forming a part of this application, in which:

FIG. 1 is a vertical sectional view through the guide bushing assembly showing a fragment of a drill pipe mounted for rotation therein;

FIG. 2 is an enlarged, fragmental, sectional view showing the construction of the ring seal employed at the end of the guide bushing nearest the hole being bored; and, FIG. 3 is a fragmental, sectional view showing a modified form of the guide bushing assembly.

Referring now to the drawing for a better understanding of our invention, we show a rotary drill pipe 10 which is rotated and supported by conventional type drilling apparatus, not shown. The drill pipe 10 is adapted to convey air from an air pressure source to clear a hole being bored of cuttings whereby the cuttings are forced outwardly of the hole between the drill pipe and the hole.

Our improved guide bushing assembly comprises a cylindrical member 11 having a hardened inner surface 12 which is of an internal diameter to engage the outer surface of the drill pipe 10 and thereby rotate with the rotary drill pipe while the drill pipe is permitted to move axially relative to the inner surface 12 of the cylindrical member 11.

Surrounding the cylindrical member 11 is an outer housing 13 having earlike members 14 projecting laterally from opposite sides thereof, as shown in FIG. 1. Suitable openings 16 are provided in the earlike members 14 for receiving upstanding support members indicated generally at 17 whereby the housing 13 is supported. The support members 17 are carried by a suitable supporting frame. The earlike members 14 of the housing 13 are secured to the support members 17 by suitable retaining members indicated generally at 18 having cap screws 19, as shown in FIG. 1.

The upper end of the housing 13 or the end thereof opposite the end nearest the hole being bored is provided with an annular, inturned flange 21 which extends inwardly across a portion of the adjacent end of the cylindrical member 11. A recess 22 is provided in the annular, inturned flange 21 for receiving an annular projection 23 at the upper end of the cylindrical member 11. Also, an annular recess 24 is provided in the upper end of the cylindrical member 11 for receiving a fibrous, annular seal 25, such as a felt seal.

As shown in FIG. 1, a reduced diameter portion 26 is provided in the cylindrical member 11 which provides an annular shoulder 27. An enlarged diameter portion 28 is provided in the inner surface of the housing 13 which provides an annular shoulder 29 in alignment with the annular shoulder 27. Mounted between the cylindrical member 11 and the inner surface of the housing 13 and abutting the annular shoulders 27 and 29 is a lubricated bearing assembly indicated generally at 31. The bearing assembly 31 comprises inner races 32 and outer races 33 with ball bearings 34 mounted between the races. An annular recess 36 is provided in the cylindrical member 11 adjacent the lowermost, inner race 32 for receiving a snapring 37 which limits axial movement of the bearing assembly 31 relative to the cylindrical member 11.

The lower end of the outer housing 13 terminates adjacent the lower end of the bearing assembly 31, as shown in FIG. 1. Secured to the lower end of the outer housing 13 by suitable cap screws 38 is an annular seal cap member 39 which abuts the lower end of the housing 13 and is provided with an upstanding projection 41 which engages the lowermost outer race 33 to thus limit axial movement of the bearing assembly 31 relative to the housing 13. Accordingly, the seal cap member 39 forms a part of the outer housing 13.

Mounted between the outer housing 13 and the outer surface of the cylindrical member 11 adjacent opposite ends of the bearing assembly 31 are annular lubricant seals 42 which prevent the egress of lubricant from the bearing assembly 31. Each lubricant seal 42 is in the form of an annular, flexible member which is tapered toward the inner edge thereof with the inner edge in sliding contact with the outer surface of the cylindrical member 11. Also, as shown in FIG. 1, the inner edge of each lubricant seal 42 extends inwardly toward the bearing assembly 31 to thus further limit the egress of lubricant therefrom.

Mounted between the inner surface of the outer housing 13 and the outer surface of the cylindrical member 11 and in axial alignment with the lubricant seals 42 are dust seals 43. Each dust seal 43 is tapered toward the outer surface of the sleeve member 11 and extends outwardly away from the lubricant seals 42 to thus further aid in preventing the ingress of foreign material into the bearing area.

Secured to the lower end of the cylindrical member 11, or the end thereof nearest the hole being bored by suitable capscrews 44, is an annular cover member 46. An annular recess 47 is provided in the under surface of the annular member 39 for receiving an annular projection 48 carried by the cover 46 to further prevent in the ingress of foreign materials into the bearing area. Oppositely disposed recesses 49 and 51 are provided in the cover member 46 and the annular member 39, respectively, for receiving an annular fibrous seal 52, such as a felt seal.

Oppositely disposed, annular recesses 53 and 54 are provided in the annular members 46 and 39, respectively, for receiving a seal ring 56. Mounted in the bottom of the recess 53 of the cover member 46 is an O-ring 57 which is formed of a resilient material, such as neoprene or the like. The resilient, O-ring 57 thus urges the seal ring 56 upwardly into firm engagement with the recess 54 in the annular member 39 whereby a positive seal is provided at all times. Preferably, the seal ring 56 is formed of a suitable metal alloy, such as an aluminum-bronze alloy. As shown in FIG. 2, an upwardly opening recess 58 is provided in the cover member 46 for receiving a pin 59 which extends transversely through an opening 61 provided in the ring seal member 56 whereby the ring seal 56 is held against rotation relative to the cover member 46 but is free to slide relative to the recess 54 in the annular member 39 of the outer housing 13.

Secured to the under surface of the cover member 46 or the side thereof nearest the hole being bored, by suitable retaining screws 62 is a cover plate 63 having a hardened under surface which is in position to be engaged by the upwardly moving cuttings and debris discharged from the hole being bored.

From the foregoing description, the construction and operation of our improved guide bushing for a rotary drill pipe will be readily understood. The ears 14 of the outer housing 13 are secured to the upstanding supports 17 in a manner well understood in the art to which our invention relates, whereby the entire guide bushing assembly is thus supported with a drill pipe 10 extending downwardly through the cylindrical member 11 with the outer surface of the drill pipe rotating with the hardened inner surface 12 and adapted for axial movement relative thereto as the drill pipe is lowered or raised. As the cuttings are discharged from the hole being bored between the drill pipe 10 and the hole, the cuttings engage the cover plate 63 and are then deflected upwardly and laterally away from the bushing assembly. Any foreign materials entering the space between the cover member 46 and the lower end of the annular member 39 of the housing 13 must first pass upwardly and around the annular projection 48 before it can reach the felt seal 52. Any foreign materials passing the felt seal 52 would then have to pass the seal ring 56. The resilient O-ring 57 exerts a constant upward force against the under surface of the seal ring 56 whereby the upper surface of the seal ring 56 remains in constant contact with the bottom of the recess 54, thus providing a positive seal between the rotating member and the stationary member. In the event any foreign materials pass the seal ring 56, they would then have to pass the lowermost dust seal 43 before reaching the lubricant seals 42.

Since only the dust falling down on top of the bushing assembly could pass through the space defined between the upper portion of the cylindrical member 11 and the inturned flange 21 of the housing 13, the annular, fibrous seal 25 would restrain the movement of foreign material. In the event foreign particles pass the felt seal 25, the uppermost dust seal 43 would then prevent the entry of the foreign particles into the area occupied by the lubricant seals 42. Also, the upper inner surface of the cylindrical member 11 is tapered as at 45 whereby any particles engaging this area would be directed downwardly into the hole being bored rather than being conveyed to the bearing area.

In FIG. 3 of the drawing, we show a modified form of our invention in which a cylindrical member 11a is provided. The cylindrical member 11a is identical to the cylindrical member 11 with the exception of the inner surface thereof. In the embodiment shown in FIG. 3, the inner surface of the cylindrical member 11a tapers inwardly as at 64 toward the hole being bored. A removable, cylindrical insert 66 having a tapered outer surface 67 is inserted in the cylindrical member 11a whereby the inside diameter of the member engaging the pipe may be varied to accommodate drill pipes of various sizes. The inwardly tapered outer surface 67 corresponds to the tapered inner surface of the member 11a whereby there is firm engagement of the insert 66 with the cylindrical member 11a. Accordingly, the inner surface of the cylindrical insert 66 extends parallel to the outer surface of the drill pipe 10. It will thus be seen that in order to accommodate drill pipes of various sizes, the insert 66 is changed.

From the foregoing, it will be seen that we have devised an improved guide bushing for rotary drill pipe. By providing a cylindrical member which rotates with the drill pipe as the drill pipe moves axially relative to the bushing, we not only eliminate torque but also eliminate the buildup of vibration and the resulting noises associated with vibration whereby the apparatus is quiet in operation. Also, by eliminating torque and vibration, our apparatus is efficient in operation and requires less power to operate. In actual practice, we have found that the life of our improved guide bushing assembly is over ten times the life of conventional type bushing assemblies heretofore employed. That is, with conventional type guide assemblies heretofore employed, the usual life of the bushing assembly was from 40 to 60 hours. On the other hand, we have operated our improved guide bushing assembly for over 500 hours in very abrasive materials, such as granite.

While we have shown our invention in but one form, it will be obvious to those skilled in the art that it is not so limited, but is susceptible of various other changes and modifications without departing from the spirit thereof.

What we claim is:

1. In a guide bushing assembly for a rotary drill pipe adapted to convey air from an air pressure source to clear a hole being bored of cuttings with the cuttings passing outwardly of the hole between the drill pipe and the hole:
   a. a cylindrical member having a hardened inner surface of a dimension to engage the outer surface of and rotate with a drill pipe and permit axial movement of said drill pipe relative thereto,
   b. an outer housing surrounding said cylindrical member,
   c. a lubricated bearing assembly having rotatable bearings between said housing and said cylindrical member supporting said cylindrical member for rotation relative to said housing,
   d. means limiting axial movement of said bearing assembly relative to said cylindrical member and said housing,
   e. an annular, flexible lubricant seal between said housing and said cylindrical member adjacent and in axial alignment with each end of said bearing assembly restraining egress of lubricant from said bearing assembly,
   f. an annular, flexible, dust seal between said housing and said cylindrical member outwardly of and in axial alignment with each said lubricant seal-restraining ingress of foreign materials into the bearing assembly,
   g. an annular cover carried by the end of said cylindrical member nearest the hole being bored and extending outwardly alongside the adjacent end of said housing,
   h. a ring seal member between said annular cover and the adjacent end of said housing with oppositely disposed annular recesses in said cover and the adjacent end of said housing receiving said ring seal member, and
   i. a resilient O-ring in one of said recesses urging said ring seal member toward the other recess.

2. A guide bushing assembly as defined in claim 1 in which an annular fibrous seal member is interposed between said annular cover and the adjacent end of said housing outwardly of said ring seal member.

3. A guide bushing assembly as defined in claim 1 in which the end of said outer housing opposite the end thereof nearest said cover extends laterally inward alongside the end of said cylindrical member adjacent thereto.

4. A guide bushing assembly as defined in claim 3 in which an annular seal member is interposed between the laterally and inwardly extending end of said housing and the adjacent end of said cylindrical member.

5. A guide bushing assembly as defined in claim 1 in which said annular, lubricant seal and said annular dust seal taper inwardly toward said cylindrical member and engage the outer surface of said cylindrical member with a sliding fit.

6. A guide bushing assembly as defined in claim 1 in which the inner edge of said lubricant seal extends inwardly toward said lubricated bearing assembly and the inner edge of said dust seal extends outwardly away from said lubricant seal.

7. A guide bushing assembly as defined in claim 1 in which the outer portion of said cover and the end of said housing adjacent thereto are provided with a cooperating annular projection and recess which restrains ingress of foreign materials therebetween.

8. A guide bushing assembly as defined in claim 1 in which a plate having a hard surface is carried by the side of said cover nearest the hole being bored.

9. A guide bushing assembly as defined in claim 1 in which the inner surface of said cylindrical member tapers inwardly toward the hole being bored and a removable, cylindrical insert having a corresponding tapered outer surface is mounted therein with the inner surface of said insert extending parallel to the outer surface of said drill pipe.

* * * * *